United States Patent
Hall (10) Patent No.: US 10,268,386 B2
(45) Date of Patent: Apr. 23, 2019

(54) DATA STORAGE DEVICE INCLUDING TEMPORARY STORAGE LOCATIONS

(71) Applicant: Western Digital Technologies, Inc., Irvine, CA (US)

(72) Inventor: David Robison Hall, Rochester, MN (US)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 194 days.

(21) Appl. No.: 15/392,760

(22) Filed: Dec. 28, 2016

(65) Prior Publication Data

US 2018/0181303 A1 Jun. 28, 2018

(51) Int. Cl.
*G06F 12/0868* (2016.01)
*G06F 12/0897* (2016.01)
*G06F 3/06* (2006.01)

(52) U.S. Cl.
CPC ............. *G06F 3/061* (2013.01); *G06F 3/064* (2013.01); *G06F 3/0676* (2013.01); *G06F 12/0868* (2013.01); *G06F 12/0897* (2013.01); *G06F 2212/1016* (2013.01); *G06F 2212/152* (2013.01); *G06F 2212/214* (2013.01); *G06F 2212/282* (2013.01); *G06F 2212/305* (2013.01)

(58) Field of Classification Search
CPC ........ G06F 3/061; G06F 3/064; G06F 3/0659; G06F 3/0665; G06F 3/0676; G06F 3/0679; G06F 12/0868; G06F 12/0897; G06F 2212/1016; G06F 2212/152; G06F 2212/214; G06F 2212/282; G06F 2212/305
See application file for complete search history.

(56) References Cited

U.S. PATENT DOCUMENTS

| 7,996,445 B2 | 8/2011 | Fair et al. |
| 8,051,252 B2 | 11/2011 | Williams |
| 8,510,504 B2 | 8/2013 | Coker et al. |

(Continued)

OTHER PUBLICATIONS

Alcorn, "SMR (Shingled Magnetic Recordings) 101", Jul. 10, 2015, tom's IT PRO, Retrieved from http://www.tomsitpro.com/articles/shingled-magnetic-recoding-smr-101-basics,2-933.html, 7 pgs.

(Continued)

*Primary Examiner* — Nanci N Wong
(74) *Attorney, Agent, or Firm* — Foley & Lardner LLP (57) ABSTRACT

A data storage device may include non-volatile storage media that includes a long-term storage region divided into a plurality of physical regions and a temporary storage region that includes at least two first tier bins. Each logical block address (LBA) span of a plurality of LBA spans may be associated with at least one physical region. Each first tier bin may be associated with a respective LBA subset of the plurality of LBA spans that includes at least two LBA spans and less than all LBA spans. The data storage device may also include a processor configured to receive first data having an LBA from a first LBA subset and second data having an LBA from a second LBA subset, and writing the first data to a first bin associated with the first LBA subset and writing the second data to a second bin associated with the second LBA subset.

20 Claims, 4 Drawing Sheets

(56) References Cited

U.S. PATENT DOCUMENTS

| | | |
|---|---|---|
| 8,654,472 B2 | 2/2014 | Hall et al. |
| 8,687,303 B2 | 4/2014 | Hall |
| 8,862,856 B2 | 10/2014 | Hall |
| 8,867,153 B1 | 10/2014 | Coker et al. |
| 8,913,335 B2 | 12/2014 | Coker et al. |
| 8,922,925 B1 | 12/2014 | Coker et al. |
| 8,941,943 B1 | 1/2015 | Coker et al. |
| 9,170,930 B1 | 10/2015 | Rowe et al. |
| 9,250,811 B1 | 2/2016 | Patiejunas |
| 9,489,145 B2 | 11/2016 | Coker et al. |
| 9,513,814 B1* | 12/2016 | Can ............... G06F 3/061 |
| 9,665,630 B1* | 5/2017 | Bigman ........... G06F 17/3053 |
| 2008/0183918 A1* | 7/2008 | Dhokia ........... G06F 12/0246 710/50 |
| 2013/0268718 A1 | 10/2013 | Hall |
| 2016/0147650 A1 | 5/2016 | Gao et al. |
| 2016/0321174 A1* | 11/2016 | Li ............... G06F 12/0866 |
| 2017/0123665 A1* | 5/2017 | Jannen ............. G06F 3/064 |
| 2017/0220267 A1* | 8/2017 | Neelakanta ........ G06F 3/0616 |

OTHER PUBLICATIONS

Crump, "Flash + SMR=Storage Density and Performance", Feb. 1, 2016, Retrieved from https://storageswiss.com/2016/02/01/flash-smr-storage-density-and-performance/, 2 pgs.

* cited by examiner

DATA STORAGE DEVICE INCLUDING TEMPORARY STORAGE LOCATIONS

TECHNICAL FIELD

The disclosure relates to data storage devices.

BACKGROUND

Data storage devices store data to physical locations of non-volatile storage media, such as magnetic recording media, flash memory chips, or the like. Host devices connected to or incorporating a data storage device may use logical addresses to specify the location of the data, while some data storage device may utilize physical addresses to specify the location of the data. This may allow the data to be stored or moved to different physical locations in the data storage device while retaining the same logical address. However, this also may result in data associated with sequentially numbered logical addresses being stored at non-contiguous physical locations of the non-volatile storage media. This may result in the data storage device performing random read operations to retrieve data associated with sequentially ordered logical addresses, which may reduce read throughput and increase time to retrieve the data.

SUMMARY

In one example, the disclosure is directed to a data storage device that may include non-volatile storage media and a processor. The non-volatile storage media may include a long-term storage region and a temporary storage region. The long-term storage region may be divided into a plurality of physical regions. Each logical block address (LBA) span of a plurality of LBA spans may be associated with at least one physical region of the plurality of physical regions. The temporary storage region may include at least two first tier bins. Each first tier bin may be associated with a respective LBA subset of the plurality of LBA spans. Each LBA subset may include at least two LBA spans and less than all of the plurality of LBA spans. The processor may be configured to receive first data having an LBA front a first LBA subset and second data having an LBA from a second LBA subset. The processor may further be configured to cause the first data and the second data to be destaged by at least writing the first data to a first bin of the at least two first tier data bins and writing the second data to a second bin of the at least two first tier data bins. The first bin may be associated with a first LBA subset and the second bin may be associated with a second LBA subset.

In another example, the disclosure may be directed to a method that includes receiving data by a processor for storage in non-volatile storage media of a data storage device. The data may include first data having a logical block address (LBA) associated with a first LBA subset of a plurality of LBA subsets and second data having a LBA associated with a second LBA subset of the plurality of LBA subsets. The non-volatile storage media may include a temporary storage region and a long-term storage region divided into a plurality of physical regions. Each LBA span of a plurality of LBA spans may he associated with a respective at least one physical region of the plurality of physical regions. The temporary storage region may include at least two first tier bins. Each first tier bin may be associated with a respective LBA subset of the plurality of LBA subsets. Each LBA subset may include at least two LBA spans and less than all of the plurality of LBA spans. The method further includes causing, by the processor, the first data and the second data to be destaged by at least writing the first data to a first bin of the at least two first tier bins and writing the second data to a second bin of the at least two first tier bins. The first bin may be associated with a first LBA subset of the plurality of LBA subsets and the second bin is associated with a second LBA subset of the plurality of LBA subsets.

In another example, the disclosure is directed to a computer-readable storage medium storing instructions that, when executed, cause a processor to receive data for storage in non-volatile storage media of a data storage device. The data may include first data having a logical block address (LBA) associated with a first LBA subset of a plurality of LBA subsets and second data having a LBA associated with a second LBA subset of the plurality of LBA subsets. The non-volatile storage media may include a temporary storage region and a long-term storage region divided into a plurality of physical regions. Each LBA span of a plurality of LBA spans may be associated with a respective at least one physical region of the plurality of physical regions. The temporary storage region may include at least two first tier bins. Each first tier bin may be associated with a respective LBA subset of the plurality of LBA subsets. Each LBA subset may include at least two LBA spans and less than all of the plurality of LBA spans. The instructions may further cause a processor to cause the first data and the second data to be destaged by at least writing the first data to a first bin of the at least two first tier bins and writing the second data to a second bin of the at least two first tier bins, the second data. The first bin may he associated with a first LBA subset of the plurality of LBA subsets and the second bin may he associated with a second LBA subset of the plurality of LBA subsets.

The details of one or more examples of the disclosure are set forth in the accompanying drawings and the description below. Other features, objects, and advantages of the disclosure will be apparent from the description and drawings, and from the claims.

DETAILED DESCRIPTION

The disclosure describes techniques for managing write operations in data storage devices. For example, the techniques may enable a host device or data storage device controller to manage random write data by temporarily storing and segregating the data in a temporary storage region of the data storage device according to logical block address spans or ranges associated with the data the temporary storage region may include bins, and each bin may be associated with a plurality of logical block address spans, but less than all logical block address spans stored by the data storage device.

For example, a shingled magnetic recording (SMR) hard disk drive (HDD) may include magnetic recording media that includes one or more temporary storage region and a shingled storage region. The shingled storage region may be divided into a plurality of physical regions. The physical regions may be separated by one or more guard bands. The SMR HDD also may separate logical block addresses (LBAs) into LBA spans. Each LBA span may be associated with one or more physical regions of the shingled storage region. The temporary storage region may be configured as a staging area to temporarily store data from a media cache or DRAM cache before permanently writing the data to the shingled storage region.

In some examples, the temporary storage region may be configured to store data based on the LBA span with which the data is associated. For example, the temporary storage region may include a plurality of bins, and each bin may be associated with a LBA subset that includes two or more LBA spans, but less than all of the LBA spans associated with the SMR HDD.

The SMR HDD may receive data associated with a plurality of LBA spans, such as a set of random writes that includes write operations associated with different LBA spans. In some examples, the SMR HDD may write the data to a cache (e.g., a media cache) and return status to the host device. At a later time, during destaging of the data from the cache, the SMR HDD then may write the data to a selected bin based on the LBA of the data and the LBA span(s) associated with the respective bins. In this way, the SMR HDD may destage data associated with multiple LBA spans to a single bin of the temporary storage region; such data associated with multiple LBAs may be sequentially written to a single bin. This may reduce a write time and increase a write throughput compared to performing random writes of the data directly to the physical region associated with the LBA span in the long-term storage region.

In some examples, the temporary storage region may include multiple tiers. Each of the tiers may include multiple bins, and each bin may be associated with some LBA subsets of the LBA subsets associated with a respective bin of the higher tier. In this way, each bin in a lower tier is associated with fewer LBA spans (or a smaller portion of an LBA span) than each bin in a higher tier. The SMR HDD may write data to a bin of a lower tier upon an associated bin of a higher tier being filled with data or in response to the SMR HDD determining that all data to be written is associated with the LBA subset associated with a bin of the lower tier. During reading of data, the SMR HDD may sequentially read each LBA span of an LBA subset containing the data, rather than randomly read each LBA span of the larger plurality of LBA spans received into the temporary storage region. This may reduce a number of reads required to read data associated with an LBA span. In this way, a time-to-first data for a read request may be reduced, as fewer parts e.g., tracks, of the temporary storage region may be read to retrieve a specified LBA or set of LBAs.

By segregating the temporary storage region by LBA span into two or more bins, each associated with an LBA subset, a host or data storage device controller may destage multiple random write commands into a single bin, thus reducing a per-write instruction time cost for writing the data. Further, utilizing bins may reduce a number of locations (e.g., tracks in an SMR HDD) that are read to read data from any given LBA span. This may reduce read latency. By providing a configuration that may initially store data in LBA subsets that each include multiple LBA spans, rather than providing a configuration that directly stores LBA subsets in individual LBA spans, a data storage device may read data within particular latency constraints, such as time to first data, and to destage data from multiple write operations at a time, which may reduce a per-operation write time.

Although the examples described herein generally relate to SMR HDDs, in other examples, the techniques described herein may be implemented in any data storage device that utilizes an indirection system that decouples logical addresses from physical locations in the data storage device. For example, the techniques described herein may be implemented in a solid state drive (SSD) that uses flash memory devices, phase change memory (PCM), resistive random access memory (ReRAM), magneto-resistive random access memory (MRAM), programmable metallization cell (PMC, otherwise known as conductive-bridging random access memory, or CBRAM®), or the like. Whereas regions of tracks are described below in the SMR HDD example, such regions may include one or more dies, blocks, pages, and other addressable memory sub-units within other forms of non-volatile memory.

Figure 1:
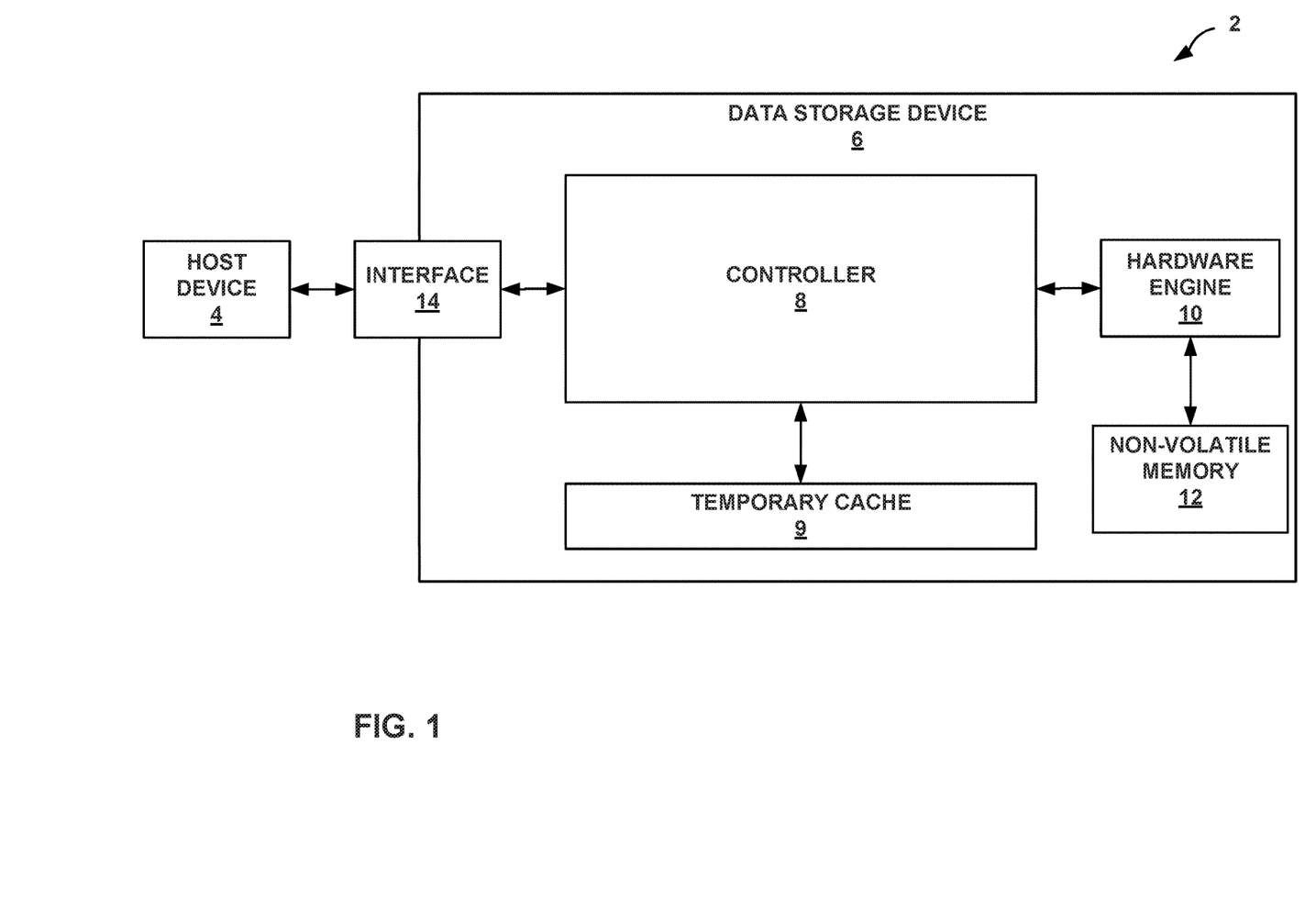
FIG. 1 is a conceptual and schematic block diagram illustrating an example storage environment in which a data storage device may function as a storage device for a host dev4ice, in accordance with one or more techniques of this disclosure.

FIG. 1 is a conceptual and schematic block diagram illustrating an example storage environment 2 in which data storage device 6 may function as a storage device for host device 4, in accordance with one or more techniques of this disclosure. For instance, host device 4 may utilize non-volatile memory devices included in data storage device 6 to store and retrieve data. In some examples, storage environment 2 may include a plurality of storage devices, such as data storage device 6, which may operate as a storage array. For instance, storage environment 2 may include a plurality of data storage device 6 configured as a redundant array of inexpensive/independent disks (RAID) that collectively function as a mass storage device for host device 4.

Storage environment 2 may include host device 4 which may store and/or retrieve data to and/or from one or more storage devices, such as data storage device 6. As illustrated in FIG. 1, host device 4 may communicate with data storage device 6 via interface 14. Host device 4 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like. Typically, host device 4 comprises any device having a processing unit, which may refer to any form of hardware capable of processing data and may include a general purpose processing unit (such as a central processing unit (CPU), dedicated hardware (such as an application specific integrated circuit (ASIC)), configurable hardware such as a field programmable gate array (FPGA) or any other form of processing unit configured by way of software instructions, microcode, firmware or the like. For the purpose of executing techniques of this disclosure, host device 4 may send write requests to controller 8 via interface 14 for the purpose of storing data using techniques described herein.

As illustrated in FIG. 1 data storage device 6 may include a controller 8, a temporary cache 9, a hardware engine 10, non-volatile memory (NVM) 12, and an interface 14. In some examples, data storage device 6 may include additional components not shown in FIG. 1 for ease of illustration purposes. For example, data storage device 6 may include power delivery components, including, for example, a capacitor, super capacitor, or battery; a printed board (PB) to which components of data storage device 6 are mechanically attached and which includes electrically conductive traces that electrically interconnect components of data storage device 6, and the like. In some examples, the physical dimensions and connector configurations of data storage device 6 may conform to one or more standard form factors. Some example standard form factors include, but are not limited to, 3.5" hard disk drive (HDD), 2.5" HDD, or 1.8" HDD.

In some examples, temporary cache 9 may store information for processing during operation of data storage device 6. Temporary cache 9 is a temporary memory, meaning that a primary purpose of temporary cache 9 is not long-term data storage. Temporary cache 9 on data storage device 6 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art. In some examples, temporary cache 9 may store data that is being processed during destaging of data for write operations, defragmentation, or the like.

In some examples, data storage device 6 may be a shingled magnetic recording (SMR) hard disc drive (HDD). With SMR, relatively wide tracks are written to data storage device 6 and successively written data tracks partially overlap the previously written data tracks. This increases the areal density of data storage device 6 by packing the tracks closer together. When energized, a magnetic field emanating from the poles writes and erases data by flipping the magnetization of small regions, called bits, on spinning platters, such as NVM 12, directly below. SMR HDDs may enable high data densities and are particularly suited for continuous writing/erasing. In other examples, data storage device 6 may be an SSD comprising flash memory as NVM 12.

NVM 12 may be configured to store larger amounts of information than cache 9. NVM 12 may further be configured for long-term storage of information as non-volatile memory space and retain information after power on/off cycles. Examples of NVM 12 include magnetic recording media, optical disks, floppy disks, flash memory, forms of electrically programmable memory (EPROM) or electrically erasable and programmable (EEPROM) memory, or the like. In some examples, NVM 12 may include one or more magnetic recording media platters in data storage device 6, each platter containing one or more regions of one or more tracks of data.

In some examples in which data storage device 6 is an SMR HDD, data storage device 6 may comprise at least three types of regions: one or more media cache regions, one or more temporary storage regions, and a long-term storage region. The one or more media cache regions may be dispersed throughout NVM 12 and configured to receive and store data for a limited number of write commands. For example, controller 8 may cause hardware engine 10 to write data to a media cache region upon receipt of the data so that controller 8 may return a status (e.g., a completion status) to host device 4. In some examples, even examples in which data storage device 6 is an SMR HDD, the one or more media cache regions may be written to using perpendicular magnetic recording (PMR) techniques, which may allow random writing to the one or more media cache regions.

The long-term storage region may be divided into a plurality of physical regions. In some examples, each physical region includes a plurality of adjacent SMR tracks. The respective regions may be separated by a guard band, which may allow writing to a radially inward long-term storage region on a magnetic recording media platter while leaving data in an adjacent, radially outward region to be unaffected by the write field.

Host device 4 may utilize logical addresses, such as logical block addresses (LBAs) to identify data. Controller 8 or host device 4 may group LBAs (e.g., sets of sequential LBAs) into LBA spans.

In some examples, controller 8 may assign an LBA span to one or more respective physical regions of the long-term storage region. By grouping LBAs in LBA spans and assigning respective LBA spans to respective physical regions, controller 8 may improve read performance of data storage device 6, e.g., by reducing a seek time or number of seeks to read multiple LBAs that are near each other.

In examples in which data storage device 6 is an SMR HDD, the long-term storage region may be a shingled storage region. Tracks on a disk surface may be organized into a shingled storage region. Once written in the shingled structure, an individual track may not be able to be updated in place because re-writing the track in place may overwrite and destroy the data in the overlapping tracks (e.g., radially outward tracks). A physical region may be an area of contiguous, overlapping magnetic tracks that are concentric with one another. Each physical region may be separated by a guard hand, or a set of one or more magnetic tracks that do not store data, to allow writing of one physical region without overwriting and destroying data in another physical region. In some examples, the logical space in LBAs of an LBA span may be the size of a physical region, but since all of the LBAS may not be associated with valid data, controller 8 may assign multiple spans to a single physical region. In other words, a series of LBAs that make up an LBA span may map to a physical space that is the size of the area of contiguous, overlapping magnetic tracks in the physical region, some smaller portion of the area of contiguous, overlapping magnetic tracks in the physical region. In other examples, a single LBA span may have a size that is larger than a physical region. As such, a single LBA span may be stored across multiple physical regions.

A portion of NVM 12 may be allocated to a temporary storage region that is used as staging areas to temporarily store data from the one or more media cache regions (e.g., in write cache disabled HDDs) or to temporarily store data from temporary cache (e.g., in write cache enabled HDDs) before permanently writing the data to a long-term storage region. The temporary storage region may be configured to store data based on LBA subset of the LBA spans. Each LBA subset may include at least two LBA spans and fewer than all of the LBA spans defined by controller 8 or host device 4.

The temporary storage region may include at least one tier, and each tier of the at least one tiers may include a plurality of bins. For example, the temporary storage region may include a single tier, and the single tier may include at least two bins. Each bin in the single tier may be associated with a respective LBA subset. For example, the single tier may include the same number of bins as there are LBA subsets.

As another example, the temporary storage region may include a plurality of tiers, and each tier may include a respective plurality of bins. For example, the temporary storage region may include three tiers. The first tier may include a plurality of first tier bins, and each first tier bin may be associated with a respective LBA subset. The second tier may include a plurality of second tier bins. For example, the second tier may include multiple second tier bins associated with each first tier bin. Each second tier bin may be associated with some of the LBA spans in the LBA subset associated with the first tier bin with which the second tier bin is associated. In this way, the second tier may further segregate the data into smaller LBA ranges.

The temporary storage region may include any number of tiers, e.g., at least one tier, and each tier may include any number of bins. In some examples, each subsequent tier includes N times the number of bins as the immediately higher tier, where N is an integer that is greater than or equal to 2.

Data storage device 6 may include interface 14 for interfacing with host device 4, interface 14 may include one or both of a data bus for exchanging data with host device 4 and a control bus for exchanging commands with host device 4. Interface 14 may operate in accordance with any suitable protocol. For example, interface 14 may operate in accordance with one or more of the following protocols: advanced technology attachment (ATA) (e.g., serial-ATA (SATA), and parallel-ATA (PATA)), Fibre Channel, small computer system interface (SCSI), serially attached SCSI (SAS), peripheral component interconnect (PCI), and PCI-express (PCIe). The electrical connection of interface 14 (e.g., the data bus, the control bus, or both) is electrically connected to controller 8, providing electrical connection between host device 4 and controller 8, allowing data to be exchanged between host device 4 and controller 8. In some examples, the electrical connection of interface 14 may also permit data storage device 6 to receive power from host device 4.

In the example of FIG. 1, data storage device 6 includes hardware engine 10, which may represent the hardware responsible for interfacing with NVM 12. Hardware engine 10 may, in the context of a platter-based hard drive, represent the magnetic read/write head and the accompanying hardware to configure, drive and process the signals sensed by the magnetic read/write head. In some examples, such as examples in which NVM 12 includes non-volatile solid-state memory devices, data storage device 6 may omit hardware engine 10.

Data storage device 6 includes controller 8, which may manage one or more operations of data storage device 6. Controller 8 may interface with host device 4 via interface 14 and manage the storage of data to and the retrieval of data from NVM 12 accessible via hardware engine 10. Controller 8 may, as one example, manage writes to and reads from the memory devices. e.g., NAND flash memory chips or magnetic recording media (e.g., a hard disk drive platter). In some examples, controller 8 may be a hardware controller. In other examples, controller 8 may be implemented in data storage device 6 as a software controller. For example, controller 8 may include one or more processors, e.g., general purpose processors, digital signal processors (DSPs), application-specific integrated circuits (ASICs), field-programmable gate arrays (FPGAs), or the like. Controller 8 may further include one or more modules or circuits that may perform techniques of this disclosure.

Host 4 may, in this respect, interface with various hardware engines, such as hardware engine 10, to interact with various sensors. Host 4 may execute software or firmware to manage interactions between host 4 and hardware engine 10. The software or firmware may perform arbitration in the context of multi-core processors, where each core effectively represents a different processor, to determine which of the processors may access hardware engine 10. The software or firmware may also perform queue management within the context of a single processor to address how various events, such as read and write requests in the example of data storage device 6, issued by host 4 should be processed by hardware engine 10 of data storage device 6.

Techniques of this disclosure may enable controller 8 to handle write requests associated with a plurality of LBA spans. Controller 8 may receive data, such as first data and second data, from host device 4 via interface 14. The data may be associated with write commands for data storage 12. The data may be associated with one or more LBA, and each LBA may be assigned to a LBA span. For example, the first data may have an LBA associated with a first LBA span of the plurality of LBA spans and the second data may have an LBA associated with a second LBA span of the plurality of LBA spans.

Upon receiving the first and second data, controller 8 may store the first and second data at a temporary location, such as temporary cache 9 or a media cache region of NVM 12 in examples in which data storage device 6 is write-cache enabled.

During destaging of the first and second data for long-term storage, controller 8 may cause the first data and the second data to be destaged by causing the first data and the second data to be moved from the temporary location (e.g., the media cache region of NVM 12 or temporary cache 9) to a temporary storage region of NVM 12. In some examples in which data storage device 6 is write-cache enabled, controller 8 may read the first data and the second data from a media cache region of NVM 12 and place the first and second data in temporary cache 9.

NVM 12 includes a temporary storage region, as described above. The temporary storage region may include at least two first tier bins. Each bin may include a selected amount of physical storage, such as one or more tracks of a magnetic recording medium. Each bin may be associated with a respective LBA subset that includes at least two LBA spans but less than all of the LBA spans stored by data storage device 6. Controller 8 may destage the data by causing the first data and the second data to be written, e.g., by hardware engine 10, to one or more bins of the at least two first tier bins. For example, the first bin may be associated with a first LBA subset that includes the first LBA span, such that the LBA of the first data is associated with the first LBA subset. Controller 8 may destage the first data by causing hardware engine 10 to write the first data to the first bin of the at least two first tier bins.

The second bin may be associated with a second LBA subset that includes the second LBA span, such that the LBA of the second data is associated with the second LBA subset. Controller 8 may destage the second data by causing hardware engine 10 to write the second data to the second bin of the at least two first tier bins. Each LBA subset may include sequential LBA spans. Further, each LBA subset may include at least two LBA spans and fewer than all of the LBA. spans stored by data storage device 6. In this way, each bin may operate as an intermediate storage tier between the media cache (e.g., high data diversity, low data organization) and the LBA spans (e.g., low data diversity, high data organization). Further detail in regards to how controller 8 receives and destages data into bins associated with respective LBA subsets is shown with respect to FIG. 2.

By segregating data by LBA span into one or more bins associated with LBA subsets, host device 4 or controller 8 may destage multiple random write commands into groups that are more likely to require fewer reads when reading the data associated with the LBA span from NVM 12. For example, temporary cache 9 may only hold a limited number of write commands during destaging, such as hundreds or thousands of write commands. In some examples, data storage device 6 may store many LBA spans, such as thousands or tens of thousands of LBA spans or more. Thus, the likelihood of controller 8 destaging multiple write commands to a particular LBA span is relatively low If data storage device 6 did not include a temporary storage region including bins as described herein, the destaging of data from temporary cache 9 thus may utilize many random writes, increasing a per-write command time cost and reducing write throughput to NVM 12. By grouping LBA spans into LBA subsets, multiple write commands for LBAs from the LBA subset may be consolidated into a sequential write, which may reduce a per-write command time cost and increase write throughput.

On the other hand, by initially destaging data in bins associated with multiple LBA spans, rather than storing data in a single temporary location associated with all LBA spans stored by data storage device 6, controller 8 may read the data associated with a selected LBA from the temporary storage region of data storage device 6 more quickly, as controller 8 may read only the bin associated with the LBA subset that includes the selected LBA rather than the entire temporary storage region. This may allow controller 8 to read within particular latency constraints, such as time to first data, and to destage data from multiple write operations at a time, which may reduce a per-operation time.

Figure 2:
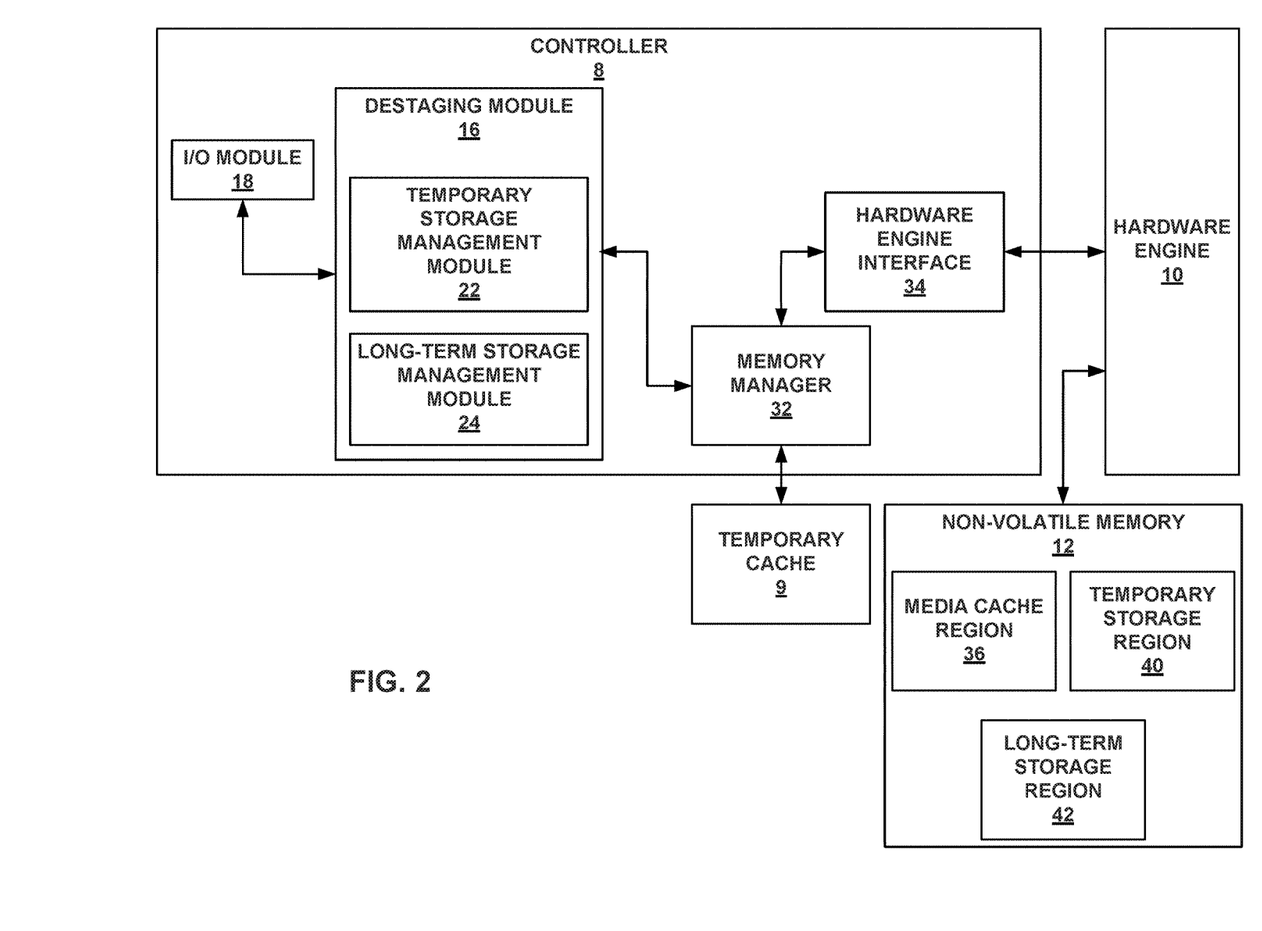
FIG. 2 is a block diagram illustrating the controller and other components of the data storage device of FIG. 1 in more detail.

FIG. 2. is a block diagram illustrating controller and other components of data storage device 6 of FIG. 1 in more detail. In the example of FIG. 2, controller 8 includes I/O module 18, destaging module 16, memory manager 32, and hardware engine interface 34. Memory manager 32 and hardware engine interface 34 may perform various functions typical of a controller 8 of a data storage device 6. For instance, hardware engine interface 34 may represent a module configured to facilitate communication between controller 8 and hardware engine 10. Hardware engine interface 34 may present a standardized or uniform way by which controller 8 interfaces with hardware engine 10. Hardware engine interface 34 may provide various configuration data and events to hardware engine 10, which may then process the event in accordance with the configuration data, returning various different types of information depending on the event. In the context of an event requesting that data be read (e.g., a read request), hardware engine 10 may return the data to hardware engine interface 34, which may pass the data to memory manager unit 32. Memory manager unit 32 may store the read data to temporary cache 9 and return a pointer or other indication of where this read data is stored to hardware engine interface 34. In the context of an event involving a request to write data (e.g. a write request), hardware engine 10 may return an indication that the write has completed to hardware engine interface unit 34. In this respect, hardware engine interface unit 34 may provide a protocol and handshake mechanism with which controller 8 interfaces with hardware engine 10.

Destaging module 16 may be configured to manage writing of data by temporarily storing and segregating the data in a temporary storage region of NVM 12 according to logical block addresses of the data. Destaging module 16 may include various modules, including temporary storage management module 22 and long-term storage management module 24. The various modules of Destaging module 16 may be configured to perform various techniques of this disclosure, including the technique described above with respect to FIG. 1. Temporary storage management module 22 and long-term storage management module 24 may perform operations described herein using software, hardware, firmware, or a mixture of both hardware, software, and firmware residing in and/or executing on a processor of controller 8. For example, temporary storage management module 22 may be configured to handle management of data to one or more media cache regions and one or more temporary storage regions of NVM 12, while long-term storage management module 24 may be configured to handle management of data to a long-term storage region of NVM 12.

In some examples, NVM 12 may be a non-volatile storage media that includes an optional media cache region 36, a temporary storage region 40, and a long-term storage region 42. Long-term storage region 42 may be divided into a plurality of physical regions. Each LBA span of the plurality of LBA spans may be associated with a respective at least one physical region of the plurality of physical regions. Temporary storage region 40 may include at least two first tier bins. Each first tier bin may be associated with a respective LBA subset of the plurality of LBA spans. An LBA subset may include at least two LBA spans and less than all of the LBA spans stored by data storage device 6.

In response to controller 8 determining to destage data associated with a write operation request, temporary storage management module 22 may cause data associated with the write operation to be written to temporary storage region 40 until the data is written to long-term storage region 42. For example, in a write cache disabled mode, temporary storage management module 22 may cause data to be read from media cache region 36 into temporary cache, in examples in Which hardware engine 10 initially writes data associated with write requests to media cache region 36 in order to return status to host 4. The data may include first data that has a LBA associated with a first LBA span of the plurality of LBA spans and second data that has a LBA associated with a second LBA span of the plurality of LBA spans. As another example, in a write cache enabled mode, hardware engine 10 may not write the first data and the second data to media cache region 36, and the first data and the second data may be stored at temporary cache 9.

In some examples, temporary storage management module 22 may perform a destaging operation of data from a first temporary location, such as a media cache region 36 or temporary cache 9, to temporary storage region 40. Temporary storage management module 22 may initiate the destaging operation in response to a temporary location, such as media cache region 36 or temporary cache 9, reaching a particular capacity or fullness percentage. In some examples, temporary storage management module 22 may initiate the destaging operation when a physical region of media cache region 36 storing the data, such as a track of a magnetic recording medium, is substantially filled (e.g., nearly filled or filled). In other examples, the destaging operation may be initiated by the host device 4 after, for example, a particular amount of time has passed or a system status change has been initiated (e.g. shutdown).

In response to a request or initiation of the destaging operation, temporary storage management module 22 may write data from temporary cache 9 to the first tier bins described above. Temporary storage management module 22 may cause hardware engine 10 to write the first data from temporary cache 9 to a first bin of at least two first tier bins based on the LBA of the first data. The first bin may be associated with a first LBA subset that includes a first LBA span that includes the LBA of the first data. Temporary storage management module 22 may cause hardware engine 10 to write the second data from temporary cache 9 to a second bin of the at least two first tier bins based on the LBA of the second data. The second bin may be associated with a second LBA subset that includes a second LBA span that includes the LBA of the second data. Both the first LBA subset and the second LBA subset may each include at least two LBA spans and less than all of the LBA spans. In this example, rather than sequentially writing the first data and the second data to a single physical location, temporary storage management module 22 cause hardware engine 10 to write the first data and the second data to separate physical locations (e.g., tracks of a magnetic recording media) according to the LBAs associated with the first data and the second data.

In some examples, host device 4 may request a sequential read of a set of LBAs that include the LBA of the first data. In a sequential read operation of a set of LBAs that include the LBA of the first data, hardware engine 10 may seek and sequentially read data associated with the set of LBAs from a physical region of long-term storage region 42 that is associated with an LBA span that includes the set of LBAs and then may seek and sequentially read data from the first bin, as the first LBA subset includes the first LBA span, which includes the set of LBAs that includes the LBA of the first data. Because all LBAs associated with the first LBA span are destaged to the first bin, hardware engine 10 may omit reading the second bin of the at least two first tier bins. By reducing the number of locations read to accomplish the sequential read of the set of LBAs, temporary storage management module 22 may return the first data to host device 4 in less time.

in some examples, temporary storage region 40 may include multiple tiers of bins. Each additional tier of bins may include more bins than the previous tier, and multiple bins in each subsequent tier may be associated with a single bin from the previous tier. Temporary storage management module 22 may destage data to a lower bin in response to a higher tier bin reaching a predetermined capacity. Temporary storage management module 22 may destage data from, for example, a first tier bin into a second tier bin, where the data is associated with an LBA span included in both the first tier bin and the second tier bin.

For example, the temporary storage region of data storage device 6 may include at least two second tier bins, in addition to the at least two first tier bins. Each second tier bin may be associated with a respective first tier bin, and may be associated with some but not all of the LBA spans from the first tier bin with which the second tier bin is associated. For example, the second tier may include N times the number of first tier bins, where N is an integer greater than or equal to 2. In this way, each respective LBA subset may be segregated into multiple portions, each portion including some but not all of the LBA spans from the respective LBA subset. In other words, each bin in the second tier is associated with fewer LBAs than each bin in the first tier.

Temporary storage management module 22 may further destage the first data by reading the first data from the first bin (e.g., along with any other data stored in the first bin. Temporary storage management module 22 may write a first subset of the first data to a first bin of the second tier bins based on LBAs of the first data. For example, temporary storage management module 22 may write data having LBAs that are from the LBA spans associated with the first bin of the second tier of bins to the first bin of the second tier of bins. The first bin of the second tier bins may be associated with a first selected set of LBAs or LBA spans from the first LBA subset. Temporary storage management module 22 may write a second subset of the first data to a second bin of the second tier bins based on LBAs of the first data. For example, temporary storage management module 22 may write data having LBAs that are from the LBA spans associated with the second bin of the second tier of bins to second first bin of the second tier of bins. The second bin of the second tier bins may be associated with a second selected set of LBAs or LBA spans from the first LBA subset.

By using multiple tiers of bins, temporary storage management module 22 may concentrate data from a smaller number of LBA spans in bins, which may require fewer reads for a sequential read of data associated with a given LBA or a defragmentation of the data. In some examples, a lowest tier of the temporary storage region may include a single LBA span in each bin of the lowest tier. In some examples, a lowest tier of the temporary storage region may include subsections of an LBA span in each bin of the lowest tier. For example, each bin of the lowest tier of bins may include a subsection of an LBA span arranged including sequentially ordered LBAs.

In some examples, a number of tiers in the temporary storage region of data storage device 6 may be selected to meet a time-to-first-data requirement for read operations from data storage device 6. In a read operation involving multiple tiers, a bin from each tier associated with the LBA span of the data may be read, as higher tiers may contain newer data that invalidates lower tier data. In this way, more tiers may result in a greater time-to-first-data. However, lower tiers may be associated with fewer LBA spans that may be read in a read operation. Factors that may influence the number of tiers may include, but are not limited to, distribution of LBA spans for write operations, a size of temporary cache 9, a time-to-first-data requirement imposed by host 4 or a user of host 4, or the like.

In some examples, temporary storage management module 22 may directly write data to a lower tier without first writing to a higher tier. For example, one or more write operations may have data associated with LBAs closely grouped, such that the LBAs all may be included in a single lower tier bin. Rather than write the data to a higher tier bin, temporary storage management module 22 may determine that the data is associated with an LBA span that is associated with a lower tier bin and write the data directly to the lower tier bin. By writing directly to a lower tier bin, temporary storage management module 22 may omit at least one destaging operation.

In some examples, temporary storage management module 22 may reorder data into ascending LBA order when writing the data to a lower tier. For example, temporary storage management module 22 may write the first subset of the first data and the second subset of the second data to the first bin of the second tier and the second bind of the second tier in ascending logical block address order. In subsequent read operations, temporary storage management module 22 may sequentially read the first data and the second data in ascending logical block address order.

Figure 3:
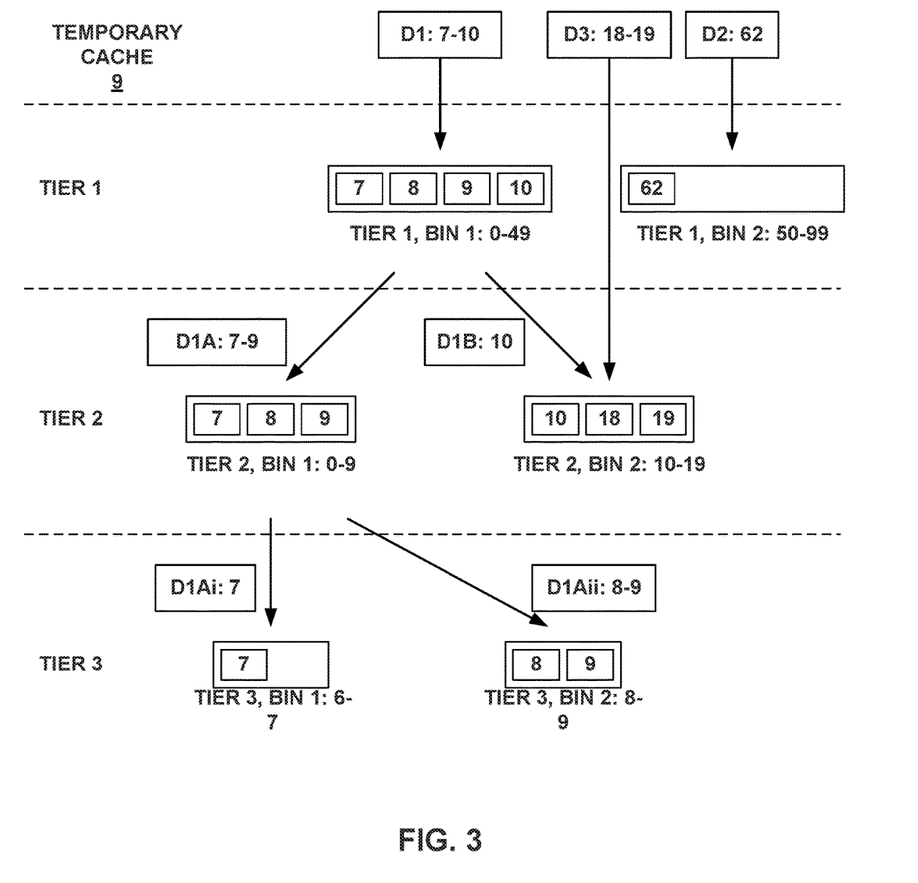
FIG. 3 is a conceptual table illustrating an example series of destaging operations, in accordance with one or more techniques of this disclosure.

FIG. 3 is a conceptual diagram illustrating an example series of destaging operations on, in accordance with one or more techniques of this disclosure. FIG. 3 will be described with concurrent reference to data storage device 6 of FIGS. 1 and 2 for purposes of illustration, although it will be understood that the destaging operations illustrated in FIG. 3 may be performed by other data storage devices, such as SSDs.

In the example of FIG. 3, the temporary storage region includes at least two first tier bins, Tier 1, Bin 1, and Tier 1, Bin 2. Each first tier bin may be associated with a respective LBA subset of the plurality of LBA spans. In this example, Tier 1, Bin 1 may be associated with LBA spans 0-49, while Tier 1, Bin 2 may be associated with LBA spans 50-99. Controller 8 may receive first data D1 that includes LBAs associated with LBA spans 7-10) and second data D2 that includes LBAs associated with LBA span 62. Controller 8 may cause data D1 and data D2 to be destaged by writing from temporary cache 9, to Tier 1, Bin 1, data D1 and writing from temporary cache 9, to Tier 1, Bin 2, data D2.

In some examples, the temporary storage region may include a second tier of bins associated with subsets of the plurality of logical block address spans. After destaging to a first tier of bins, controller 8 may destage the data further to the second, lower tier of bins. For example, controller 8 may destage the data stored in a bin of Tier 1 upon the bin filling or nearly filling with data. Each bin in the second tier may be associated with fewer LBA spans than each bin in the first tier, and may be associated with a respective bin of the first tier. The temporary storage region may include at least two second tier bins. The example of FIG. 3 illustrates two Tier 2 bins, Tier 2, Bin 1, and Tier 2, Bin 2, although Tier 2 may include at least two other bins associated with Tier 1 Bin 2. Each second tier bin may be associated with some LBA spans from the LBA subset of the Tier 1 bin with which the Tier 2 bin is associated. In this example, Tier 2, Bin 1 may be associated with LBA spans 0-9 from the LBA spans 0-49 of Tier 1, Bin 1. Tier 2, Bin 2 may be associated with LBA spans 10-19 from the LBA spans 0-49 of Tier 1, Bin 1. Tier 2 may also include other bins associated with LBA spans 20-49 of Tier 1, Bin 1, although these other bins are not shown in FIG. 3.

Controller 8 may be configured to cause data D1 to be destaged from Tier 1 by reading data D1 from Tier 1, Bin 1. Data D1 may include a first subset D1A associated with LBA spans 7-9 and a second subset D1B associated with LBA span 10. Controller 8 may write first subset D1A of data D1 to Tier 2, Bin 1 based on LBA spans 7-10 of data D1 and the LBA spans associated with Tier 2, Bin 1. Controller 8 may also write second subset D1B of data D1 to Tier 2, Bin 2 based on LBA spans 7-10 of data D1 and the LBA spans associated with Tier 2, Bin 2.

In some examples, the temporary storage region may include a third tier of bins associated with a subset of the plurality of logical block address spans. After destaging to a first tier of bins and a second tier of bins, controller 8 may destage the data further to the third, lower tier of bins. Each bin in the third tier may be associated with fewer LBA spans than each bin in the first tier and the second tier and may be associated with a respective bin of the second tier. The temporary storage region may include at least two third tier bins, Tier 3, Bin 1, and Tier 3, Bin 2, although Tier 3 may include at least two other bins associated with Tier 2, Bin 2 and the other bins of the second tier. Each third tier bin may be associated with a respective subset of the plurality of LBA spans. In this example, Tier 3, Bin 1 is associated with LBA spans 6-7 from the set of LBA spans 0-9 of Tier 2, Bin 1, from the LBA spans 0-49 of Tier 1, Bin 1. Tier 3, Bin 2 may be associated with LBA spans 8-9 from the LBA spans 0-9 of Tier 2, Bin 1, from the LBA spans 0-49 of Tier 1, Bin 1.

Controller 8 may be configured to cause first subset D1A of data D1 to be destaged from the second tier by reading first subset D1A of data D1 from Tier 2. Bin 1, First subset D1A of data D1 may include a further first subset D1Ai associated with LBA span 7 and a further second subset D1Aii associated with LBA spans 8-9. Controller 8 may write first subset D1Aii of first subset D1A of data D1 to Tier 3, Bin 1 based on LBA spans 7-9 of first subset D1A of data D1 and the LBA spans associated with Tier 3, Bin 1. Controller 8 may also write second subset D1Aii of first subset D1A of data D1 to Tier 3. Bin 2 based on LBA spans 7-9 of first subset D1A of data D1 LBA spans associated with Tier 3, Bin 2.

In some examples, controller 8 may skip one or more upper tiers and directly write data to a bin in a lower tier. For example, if one or more write operations include data having a narrow range of LBA spans associated with a single bin of a lower tier, controller 8 may write the data directly to the lower tier, eliminating a write to the upper tier. For example, controller 8 may cause data D3 associated with logical spans 18-19 to be destaged by writing, to Tier 2, Bin 1, data D3 without first writing to Tier 1, Bin 1.

Controller 8 may continue destaging data to lower tiers as upper tiers fill with data. Once a bin of a lowest tier is filled or nearly filled with data, controller 8 may cause the data in the bin to be written to the at least one physical region of long-term storage region 42 that is associated with the LBA span associated with the bin.

Figure 4:
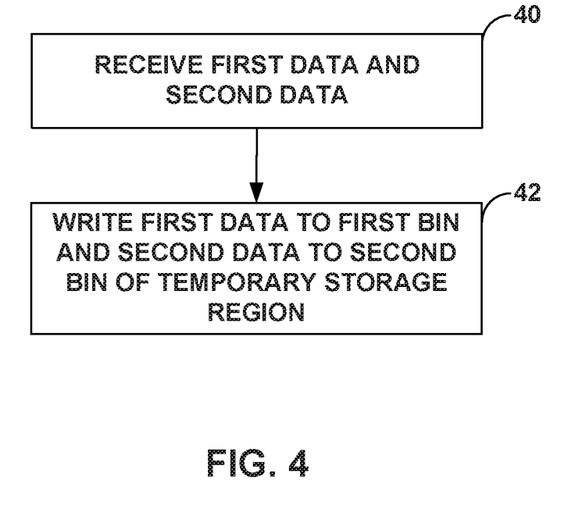
FIG. 4 is a flow diagram illustrating an example operation of a data storage device controller in performing various aspects of the write techniques described in this disclosure.

FIG. 4 is a flow diagram illustrating example write management operations performed by a controller of a data storage device, in accordance with one or more techniques described in this disclosure. For ease of illustration, the example technique of FIG. 4 will be described with concurrent reference to data storage device 6 and controller 8 of FIGS. 1 and 2. However, the techniques may be used with any combination of hardware and software.

In accordance with the principles of the disclosure, in some examples, controller 8 may receive first data and second data, from host device 4 via interface 14 (41), for writing into long-term storage, such as data storage device 6. Data storage device 6 may be a non-volatile storage media that includes a temporary storage region and a long-term storage region. The long-term storage region may be divided into a plurality of physical regions. Each LBA span of a plurality of LBA spans may be associated with a respective at least one physical region of the plurality of physical regions. The temporary storage region may include at least two first tier bins. Each bin may be associated with a respective LBA subset of the plurality of LBA spans. The first data may include an LBA associated with a first LBA span of the plurality of LBA spans and the second data may include an LBA associated with a second LBA span of the plurality of LBA spans. Each LBA subset may include at least two LBA spans and fewer than all of the LBA spans stored by data storage device 6.

Controller 8 may cause the first data and the second data to be destaged by writing the first data to a first bin of the at least two first tier bins and the second data to a second bin of the at least two first tier bins (42). The first bin may be associated with a first LBA subset of the plurality of LBA spans and the second bin may be associated with a second LBA subset of the plurality of LBA spans. Each LBA subset may include sequential LBA spans.

The techniques described in this disclosure may be implemented, at least in part, in hardware, software, firmware, or any combination thereof. For example, various aspects of the described techniques may be implemented within one or more processing units, including one or more microprocessing units, digital signal processing units (DSPs), application specific integrated circuits (ASICs), field programmable gate arrays (FPGAs), or any other equivalent integrated or discrete logic circuitry, as well as any combinations of such components. The term "processing unit" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processing units, or other processing units, to implement one or more of the techniques described herein, such as when instructions included or encoded in the computer-readable storage medium are executed by the one or more processing units. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disk ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples of the disclosure have been described. Any combination of the described systems, operations, or functions is contemplated. These and other examples are within the scope of the following claims.

The invention claimed is:

1. A method comprising:
   receiving, by a processor, for storage in non-volatile storage media of a data storage device:
      first data having a logical block address (LBA) associated with a first LBA subset of a plurality of LBA subsets, and
      second data having a LBA associated with a second LBA subset of the plurality of LBA subsets,
   wherein the non-volatile storage media comprises:
   a temporary storage region, and
   a long-term storage region divided into a plurality of physical regions,
      wherein each LBA span of a plurality of LBA spans is associated with a respective at least one physical region of the plurality of physical regions, wherein the temporary storage region comprises at least two first tier bins, each first tier bin associated with a respective LBA subset of the plurality of LBA subsets, and wherein each LBA subset includes at least two LBA spans and less than all of the plurality of LBA spans; and
   after receiving the first data and the second data, causing, by the processor, the first data, and the second data to be destaged together by at least:
      writing, to a first bin of the at least two first tier bins, the first data; and
      writing, to a second bin of the at least two first tier bins, the second data, wherein the first bin is associated with a first LBA subset of the plurality of LBA subsets and the second bin is associated with a second LBA subset of the plurality of LBA subsets.

2. The method of claim 1, wherein the temporary storage region further comprises at least two second tier bins, each second tier bin associated with a some LBA spans from the first LBA subset or some LBA spans from the second LBA subset, and wherein causing the first data to be destaged further comprises:
   reading, from the first bin of the at least two first tier bins, the first data;
   writing, to a first bin of the at least two second tier bins that is associated with a first set of LBA spans from the first LBA subset, a first subset of the first data based on LBAs of the first data; and
   writing, to a second bin of the at least two second tier bins that is associated with a second set of LBA spans from the first LBA subset, a second subset of the first data based on LBAs of the first data.

3. The method of claim 2, wherein the temporary storage region further comprises at least two third tier bins, each third tier bin associated with a respective set of LBAs that is smaller than the first set of LBA spans and smaller than the second set of LBA spans, and wherein the method further comprises:
   reading, from the first bin of the at least two second tier bins, the first subset of the first data;
   writing, to a first bin of the at least two third tier bins that is associated with a first set of LBAs from the first set of LBA spans, a first subset of the first subset of the first data based on LBAs of the first data; and
   writing, to a second bin of the at least two third tier bins that is associated with a second set of LBAs from the first set of LBA spans, a second subset of the first subset of the first data based on LBAs of the first subset of the first data.

4. The method of claim 2, further comprising:
   receiving, by the processor, third data associated with a third LBA span; and
   causing, by the processor, the third data to be destaged by at least:
      writing, to one of the at least two second tier bins, the third data without first writing the third data to one of the at least two first tier bins.

5. The method of claim 1, wherein a number of tiers of the temporary storage region is selected to meet a time to first data requirement for read operations from the data storage device.

6. The method of claim 1, wherein the non-volatile storage media comprises magnetic recording media, wherein each bin includes one or more tracks of a perpendicular magnetic recording region of the magnetic recording media, and wherein the long-term storage region comprises a shingled magnetic recording region of the magnetic recording media.

7. The method of claim 1, wherein the data storage device is a solid-state drive.

8. The method of claim 2, further comprising writing the first subset of the first data and the second subset of the first data according to ascending LBA order.

9. A data storage device comprising:
non-volatile storage media comprising:
a temporary storage region, and
a long-term storage region divided into a plurality of physical regions,
wherein each logical block address (LBA) span of a plurality of LBA spans is associated with a respective at least one physical region of the plurality of physical regions, and
wherein the temporary storage region comprises at least two first tier bins, each first tier bin associated with a respective LBA subset of the plurality of LBA spans, wherein each LBA subset includes at least two LBA spans and less than all of the plurality of LBA spans; and
a processor configured to:
receive first data having an LBA from a first LBA subset and second data having an LBA from a second LBA subset; and
after receiving the first data and the second data, cause the first data and the second data together to be destaged by at least:
writing, to a first bin of the at least two first tier bins, the first data; and
writing, to a second bin of the at least two first tier bins, the second data, wherein the first bin is associated with a first LBA subset and the second bin is associated with a second LBA subset.

10. The data storage device of claim 9, wherein the temporary storage region further comprises at least two second tier bins, each second tier bin associated with some LBA spans from the first LBA subset or some LBA spans from the second LBA subset, and wherein the processor is further configured to cause the first data to be destaged by at least:
reading, from the first bin of the at least two first tier bins, the first data;
writing, to a first bin of the at least two second tier bins that is associated with a first set of LBA spans from the first LBA subset, a first subset of the first data based on LBAs of the first data; and
writing, to a second bin of the at least two second tier bins that is associated with a second set of LBA spans from the first LBA subset, a second subset of the first data based on LBAs of the first data.

11. The data storage device of claim 10, wherein the temporary storage region further comprises at least two third tier bins, each third tier bin associated with a respective set of LBAs that is smaller than the first set of LBA spans and smaller than the second set of LBA spans, and wherein the processor is further configured to cause the first subset of the first data to be destaged by at least:
reading, from the first bin of the at least two second tier bins, the first subset of the first data;
writing, to a first bin of the at least two third tier bins that is associated with a first set of LBAs from the first set of LBA spans, a first subset of the first subset of the first data based on LBAs of the first data; and
writing, to a second bin of the at least two third tier bins that is associated with a second set of LBAs from the first set of LBA spans, a second subset of the first subset of the first data based on logical block addresses of the first data.

12. The data storage device of claim 10, wherein the processor is further configured to:
receive third data associated with a third LBA span; and
cause the third data to be destaged by at least:
writing, to one of the at least two second tier bins, the third data without first writing the third data to one of the at least two first tier bins.

13. The data storage device of claim 9, wherein a number of tiers of the temporary storage region is selected to meet a time to first data requirement for read operations from the data storage device.

14. The data storage device of claim 9, wherein the non-volatile storage media comprises magnetic recording media, wherein each bin includes one or more tracks of a perpendicular magnetic recording region of the magnetic recording media, and wherein the long-term storage region comprises a shingled magnetic recording region of the magnetic recording media.

15. The data storage device of claim 9, wherein the data storage device is a solid-state drive.

16. The data storage device of claim 11, wherein the processor is further configured to write the first subset of the first data and the second subset of the first data according to ascending LBA order.

17. A non-transitory computer-readable storage medium storing instructions that, when executed, cause a processor to:
receive for storage in non-volatile storage media of a data storage device,
first data having a logical block address (LBA) associated with a first LBA subset of a plurality of LBA subsets, and
second data having a LBA associated with a second LBA subset of the plurality of LBA subsets,
wherein the non-volatile storage media comprises:
a temporary storage region, and
a long-term storage region divided into a plurality of physical regions,
wherein each LBA span of a plurality of LBA spans is associated with a respective at least one physical region of the plurality of physical regions, and wherein the temporary storage region comprises at least two first tier bins, each first tier bin associated with a respective LBA subset of the plurality of LBA subsets, and wherein each LBA subset includes at least two LBA spans and less than all of the plurality of LBA spans; and
after receiving the first data and the second data, cause the first data and the second data to be destaged together by at least:
writing, to a first bin of the at least two first tier bins, the first data; and
writing, to a second bin of the at least two first tier bins, the second data, wherein the first bin is associated with a first LBA subset of the plurality of LBA subsets and the second bin is associated with a second LBA subset of the plurality of LBA subsets.

18. The non-transitory computer-readable storage medium of claim 17, wherein the temporary storage region further comprises at least two second tier bins, each second tier bin associated with a some LBA spans from the first LBA subset or some LBA spans from the second LBA subset, and wherein the instructions further cause the processor to destage the first data by at least:
reading, from the first bin of the at least two first tier bins, the first data;

writing, to a first bin of the at least two second tier bins that is associated with a first set of LBA spans from the first LBA subset, a first subset of the first data based on LBAs of the first data; and writing, to a second bin of the at least two second tier bins that is associated with a second set of LBA spans from the first LBA subset, a second subset of the first data based on LBAs of the first data.

19. The non-transitory computer-readable storage medium of claim 18, wherein the temporary storage region further comprises at least two third tier bins, each third tier bin associated with a respective set of LBAs that is smaller than the first set of LBA spans and smaller than the second set of LBA spans, and wherein the instructions further cause the processor to destage the first subset of the first data by at least:

reading, from the first bin of the at least two second tier bins, the first subset of the first data;

writing, to a first bin of the at least two third tier bins that is associated with a first set of LBAs from the first set of LBA spans, a first subset of the first subset of the first data based on LBAs of the first subset of the first data; and writing, to a second bin of the at least two third tier bins that is associated with a second set of LBAs from the first set of LBA spans, a second subset of the first subset of the first data based on LBAs of the first subset of the first data.

20. The non-transitory computer-readable storage medium of claim 19, wherein the instructions further cause the processor to:

receive third data associated with a third LBA span; and
destage the third data by at least:
writing, to one of the at least two second tier bins, the third data without first writing the third data to one of the at least two first tier bins.

* * * * *